Figure 1:
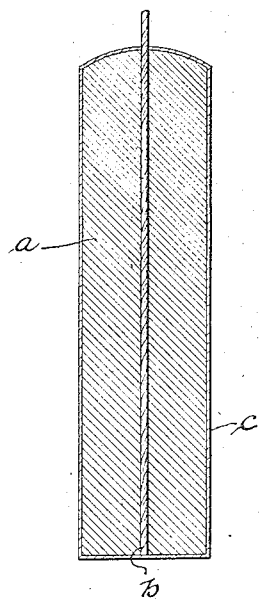

H. O. BERG.
STERILIZED MEDICINAL CANDLE AND METHOD OF MAKING SAME.
APPLICATION FILED MAR. 29, 1918.

1,289,093. Patented Dec. 31, 1918.

Inventor
Hart O. Berg
By A. B. Foster, Attorney

UNITED STATES PATENT OFFICE.

HART O. BERG, OF PARIS, FRANCE.

STERILIZED MEDICINAL CANDLE AND METHOD OF MAKING SAME.

1,289,093.　　　　　Specification of Letters Patent.　　Patented Dec. 31, 1918.

Application filed March 29, 1918. Serial No. 225,521.

*To all whom it may concern:*

Be it known that I, HART O. BERG, a citizen of the United States, residing at Paris, Republic of France, have invented certain new and useful Improvements in Sterilized Medicinal Candles and Methods of Making Same, of which the following is a specification.

The present invention relates to protecting candles made of curative or medicinal preparations, and has reference in particular to candles made of, or consisting essentially of mixtures of paraffinous material and other material, which mixtures may be readily melted, by the flame of the candle, and the melted material thereby applied to desired portions of the living body, to which such application is desired, for producing curative or similar effects.

It has recently been proposed to make candles of ambrine and similar material, which candles may be wrapped in paraffined paper or other similar paper, the ambrine paper or similar material being heated, either before or at the time of molding, to a temperature sufficient to sterilize the said material. One objection to wrapping candles of this character in paper is that during the wrapping operation, the candles may acquire bacteria from the hands of the operator, or from the tables or benches upon which such work is done, or in handling the candles between the molding operation and the subsequent wrapping operation.

In accordance with the present invention, the candles after being made, are first subjected to an atmosphere of a bactericidal gas or vapor, at a temperature sufficiently low not to produce any melting of the candle material, and to thereafter coat the candles of which the surface has been so sterilized, with a film of material which is impervious to bacteria, solutions of waxes, resins, cellulose esters and the like in volatile solvents being suitable for the purpose.

As a specific example of procedure falling within the scope of the present invention, and to which example the said invention is not restricted, I give the following.

The candles after being made, are first placed in a receptacle, and are there treated with formaldehyde gas or other suitable gas or vapor, for a length of time sufficient to completely sterilize the surface, after which the candles are dipped into an alcoholic solution of shellac or similar material. In the sterilization with formaldehyde gas, it is not necessary to employ heat, the gas being an active germicidal agent at ordinary room temperature. The candles may be dipped into, or otherwise coated with a solution of shellac in alcohol (grain alcohol, wood alcohol, denatured alcohol or other suitable solvent) and are then allowed to dry at ordinary room temperature.

In place of the formaldehyde gas, other gases having bactericidal properties can be used, and especially such as are active at ordinary room temperature. In place of the alcoholic solution of shellac, solutions of various waxes, resins or cellulose esters, such as cellulose acetate may be employed, or in other cases solutions of nitro-cellulose can be used, to which solutions, suitable materials for reducing the inflammability may be added.

In the burning of candles such as described the thin coating of material burns away at about the same rate as the candle itself, and in such burning any bacteria present upon such coating will be destroyed by the heat.

It will be obvious that the solvent employed in the coating composition or varnish should be one which does not injuriously affect the composition of which the candle is made, and for this reason, volatile solvents of the coating composition, which are not solvents of paraffin and similar material should preferably be used.

Figure 2:
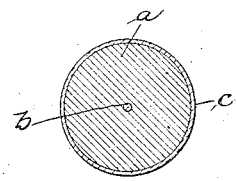

In the accompanying drawing I have shown a candle after treatment in accordance with the present invention. In said drawings, Figure 1 shows a central section, lengthwise of the candle, and Fig. 2, a section at right angles to the plane of Fig. 1. In said drawings, *a* is a candle having a wick *b*. This candle, after the sterilizing operation is coated with a layer *c*, of coating composition, *e. g.* one of the varnishes above referred to.

The thickness of the coating is greatly exaggerated in the drawing.

From the above description it will be understood that the application of the formaldehyde or similar gas or vapor may be made after all of the handling of the candles which may be necessary or desirable prior to the coating operation, and that there will be no handling or mechanical working of the candles between the sterilizing of the surface and the coating of this surface with varnish of any suitable kind. The treatment of the candles with formaldehyde or equivalent material produces the effect of first rendering the surface of said candle sterile or aseptic.

The invention is applicable not only to candles made of ambrine, but to candles or other structures made from a material of which the base is paraffin or other suitable material, to which additions of various substances having curative or pharmaceutical properties, or of substances capable of increasing the tenacity of the film or layer of the mass applied to the living body, or for improving the physical characteristics of such layer or film, have been made.

In the original material, at the time of making candles therefrom, the material is heated sufficiently to sterilize the same, but in such handling as is necessary or incident to the subsequent operations of wrapping and the like, the surfaces of the candle are liable to pick up bacteria from the hands of the operatives, and it is to destroy such bacteria that the preliminary bactericidal treatment is given, and it is not necessary that the said treatment should extend throughout the body of such candles, the surface being entirely sufficient.

What is claimed is:

1. The herein described process of treating candles composed of pharmaceutical meltable preparations, which comprises subjecting such candles first to a bactericidal atmosphere for a sufficient length of time to render the surface of the candle aseptic, and thereafter coating the so treated candles with a coating composition impervious to bacteria.

2. A process which comprises subjecting candles of meltable curative preparations to the action of formaldehyde gas, and subsequently coating the so treated candles with a solution of a bacteria-proof agent in a volatile liquid which is a non-solvent of the material of which the candle is composed, and allowing the film of solution so produced to dry.

3. In the herein described process of treating candles composed of pharmaceutical material, the step which comprises coating a candle of which the surface is sterilized, with a varnish, and drying the varnish to produce an impervious film, whereby the candle is rendered aseptic.

4. A candle composed of a sterilized mixture of paraffin and other material blending therewith, which mixture is capable of melting at a temperature sufficiently low to permit application of the molten material to the living body without injury thereto, coated with a film of dried varnish impervious to bacteria.

In testimony whereof I affix my signature.

HART O. BERG.